United States Patent [19]

Andrews

[11] Patent Number: 5,529,041

[45] Date of Patent: Jun. 25, 1996

[54] ACTIVE ENGINE MISFIRE DETECTION SYSTEM

[75] Inventor: Eric B. Andrews, Columbus, Ind.

[73] Assignee: Cummins Engine Company, Inc., Columbus, Ind.

[21] Appl. No.: 438,179

[22] Filed: May 9, 1995

[51] Int. Cl.[6] .......................... F02D 41/22; G01M 15/00
[52] U.S. Cl. ............................. 123/436; 73/117.3
[58] Field of Search .................... 123/436, 479, 123/481; 73/116, 117.3; 364/431.07, 431.08

[56] References Cited

U.S. PATENT DOCUMENTS

| | | | |
|---|---|---|---|
| 4,366,793 | 1/1983 | Coles | 123/436 |
| 4,442,815 | 4/1984 | Ninomiya | 123/436 |
| 4,489,690 | 12/1984 | Burkel et al. | 123/436 X |
| 4,928,228 | 5/1990 | Fujimoto et al. | 364/431.09 |
| 4,930,479 | 6/1990 | Osawa et al. | 123/436 |
| 4,932,379 | 6/1990 | Tang et al. | 123/436 |
| 5,035,220 | 7/1991 | Uchinami et al. | 123/436 |
| 5,088,318 | 2/1992 | Osawa | 73/117.3 |
| 5,165,271 | 11/1992 | Stepper et al. | 73/116 |
| 5,213,081 | 5/1993 | Fujimoto | 123/419 |
| 5,303,158 | 4/1994 | Kuroda | 364/431.08 |

FOREIGN PATENT DOCUMENTS

| | | | |
|---|---|---|---|
| 408518 | 1/1991 | European Pat. Off. | 123/436 |
| 58-217732 | 12/1983 | Japan | 123/436 |
| 2222887 | 3/1990 | United Kingdom . | |

*Primary Examiner*—Tony M. Argenbright
*Attorney, Agent, or Firm*—Woodard, Emhardt, Naughton Moriarty & McNett

[57] ABSTRACT

An engine misfire detection system for an internal combustion engine includes a microprocessor based controller for providing an increasing fuel command signal to any cylinder in the engine. The contribution to engine speed of the particular cylinder under test is monitored and compared to the contribution to engine speed of the previous two cylinders in the firing sequence. A misfire condition is detected if the average contribution to engine speed of the cylinder under test does not exceed the greater average contribution to engine speed of the previous two cylinders by a predetermined amount after a predetermined number of engine cycles. A temporary fault is logged for the cylinder under test if such a misfire condition occurs a predetermined subsequent number of times thereafter. If such a temporary fault condition is detected during a subsequent driving cycle, a driver warning lamp is illuminated.

40 Claims, 12 Drawing Sheets

ACTIVE ENGINE MISFIRE DETECTION SYSTEM

FIELD OF THE INVENTION

This invention relates in general to methods and apparatus for fueling internal combustion engines, and more specifically to systems for detecting irregular combustion, such as misfire conditions, in internal combustion engines.

BACKGROUND OF THE INVENTION

The ability to detect misfiring cylinders (specifically, dead cylinders) in an internal combustion engine has been mandated by the California Air Resources Board (CARB) as part of the On Board Diagnostics (OBD II) program targeted primarily for diesel engine-based vehicles. Under OBD II, each cylinder must be monitored at least once per driving cycle and any misfiring cylinder, as well as whether multiple cylinders are misfiring, must be identified. Upon detection of a sufficient number of misfires, OBD II requires that the driver be notified of such a fault condition via illumination of a driver-observable lamp (MIL). Manufacturers of vehicles having diesel engines must comply with OBD II by Jan. 1, 1998 for any such vehicles sold thereafter in California.

Various prior ark devices have been employed to sense, and possibly thereafter act upon, engine misfire. One such misfire detection system is disclosed in U.S. Pat. No. 5,213,081 to Fujimoto. Fujimoto discloses a system wherein engine speed at various crank angles is detected and thereafter compared with corresponding engine speeds at a subsequent firing cycle. If a particular cylinder is detected as possibly misfiring, fuel to that cylinder is decreased to a level sufficient to induce misfiring and the engine speed corresponding to the crank angle for that cylinder is compared to its previous value. If the two speeds are sufficiently similar, then a misfire is verified.

Another misfire detection system is disclosed in U.S. Pat. No. 4,366,793 to Coles, wherein engine speeds for each cylinder are compared to their corresponding speeds at the previous firing cycle, and misfires are detected if the difference in any of such speeds is below a reference threshold. If a misfire is so detected, the fuel-to-air mixture for that cylinder is increased in an attempt to compensate for the misfire due to an excessively lean fuel mixture.

Several other U.S. Patents including U.S. Pat. Nos. 5,303,158 to Kuroda, No. 5,088,318 to Osawa, No. 4,932,379 to Tang et al., No. 4,930,479 to Osawa et al. and No. 4,928,228 to Fujimoto et al., disclose similar misfire detection systems wherein, under normal fueling conditions, each cylinder's contribution to engine speed is monitored and compared to its contribution at the previous firing cycle. Such speed differences are thereafter used, according to various approaches, to detect a misfire condition.

What all these efforts have in common is that they are "passive" monitors; that is, they monitor each cylinder's contribution to engine speed under normal fueling conditions and register a misfire upon detection of a characteristic deceleration. Such systems are susceptible to incorrectly detecting engine misfire, i.e. false positive failures, owing to calibration errors, fueling inconsistencies and lag times and other fuel system control problems. Moreover, "weak" misfire conditions that may not be readily discernable at low idle conditions may not be detected in such systems. What is therefore needed is a misfire detection system that actively challenges an engine's response to changing fueling conditions. Such an "active" misfire detection strategy should be inherently more robust than a "passive" misfire detection strategy, and thereby generally lead to fewer incorrectly detected engine misfires.

SUMMARY OF THE INVENTION

The foregoing problems associated with prior art misfire detection systems are addressed by the active engine misfire detection system of the present invention. According to one aspect of the present invention, an apparatus for detecting a misfire condition in a cylinder of an internal combustion engine comprises a fueling system responsive to a fueling signal to supply fuel to the engine cylinder, an engine speed sensor operable to sense engine speed at a predetermined crank angle of the engine corresponding to the engine speed of the cylinder and provide an engine speed signal corresponding thereto, and a microprocessor providing a fueling signal to the fueling system to supply a quantity of fuel to the engine cylinder in excess of that demanded by the engine cylinder. The microprocessor is responsive to the engine speed signal to detect a misfire condition in the engine cylinder if the engine speed at the predetermined crank angle has not increased in accordance with the excess quantity of fuel supplied thereto within a number of subsequent engine cycles.

In accordance with another aspect of the present invention, an apparatus for detecting a misfire condition in a cylinder of an internal combustion engine comprises a fuel control system responsive to a fuel command input signal to provide a fueling signal, a fueling system responsive to the fueling signal to supply fuel to the engine cylinder, an engine speed sensor operable to sense engine speed at a predetermined crank angle of the engine corresponding to the engine speed of the cylinder and provide an engine speed signal corresponding thereto, and a microprocessor providing the fuel command input signal to the fuel control system. The microprocessor is operable in a first mode to permit the fuel control system to provide the fueling signal to the fueling system to thereby fuel the cylinder in accordance with engine demand, and in a second mode to receive the fueling signal from the fuel control system and provide an altered fueling signal to the fueling system to thereby supply a quantity of fuel to the cylinder above that demanded by the engine. The microprocessor is responsive to the engine speed signal in the second mode of operation to detect a misfire condition in the engine cylinder if the engine speed at the predetermined crank angle has not increased in accordance with the excess quantity of fuel supplied thereto within a number of subsequent engine cycles.

According to a further aspect of the present invention, a method of detecting a misfire condition in a cylinder of an internal combustion engine, wherein the engine has an engine speed sensor associated therewith for sensing engine speed, comprises the steps of: (1) providing a quantity of fuel to the cylinder in excess of that demanded by the cylinder, (2) sensing engine speed at a predetermined crank angle of the engine corresponding to the engine speed of the cylinder, and (3) detecting a misfire condition in the cylinder if the engine speed at the predetermined crank angle has not increased in accordance with the excess quantity of fuel supplied thereto within a number of subsequent engine cycles.

According to yet another aspect of the present invention, a method of detecting a misfire condition in a cylinder of an internal combustion engine, wherein the engine has an engine speed sensor associated therewith for sensing engine speed, comprises the steps of: (1) sensing an average engine speed, (2) performing step (1) until the average engine speed is below a maximum idle speed for at least a first delay period, (3) providing a quantity of fuel to the cylinder in excess of that demanded by the cylinder, (4) sensing engine speed at a predetermined crank angle of the engine corresponding to the engine speed of the cylinder, (5) sensing an average engine speed, (6) returning to step (1) if the average engine speed is below the maximum idle speed, (7) detecting a normal cylinder condition if the engine speed at the predetermined crank angle has increased in accordance with the excess quantity of fuel supplied thereto, (8) performing steps (3)–(7) for a number of engine cycles unless a normal cylinder condition is detected; and (9) detecting a misfire condition in the cylinder if a normal cylinder condition has not been detected.

One object of the present invention is to provide an apparatus and method for actively detecting a misfire condition in an engine cylinder by overfueling the cylinder and monitoring the cylinder for an expected increase in engine speed.

Another object of the present invention is to provide an apparatus and method for fueling a cylinder in an internal combustion engine wherein the fueling system is operable in a first mode to fuel the cylinder in accordance with engine demand, and in a second mode to overfuel the cylinder and monitor the cylinder for a misfire condition.

A further object of the present invention is to provide an apparatus and method for overfueling an engine cylinder and monitoring the cylinder for a misfire condition, and activating a driver warning device if a misfire condition is detected a predetermined number of times within a predetermined number of sequential driving cycles.

These and other objects of the present invention will become more apparent from the following description of the preferred embodiment.

DESCRIPTION OF THE PREFERRED EMBODIMENT

Figure 1A:
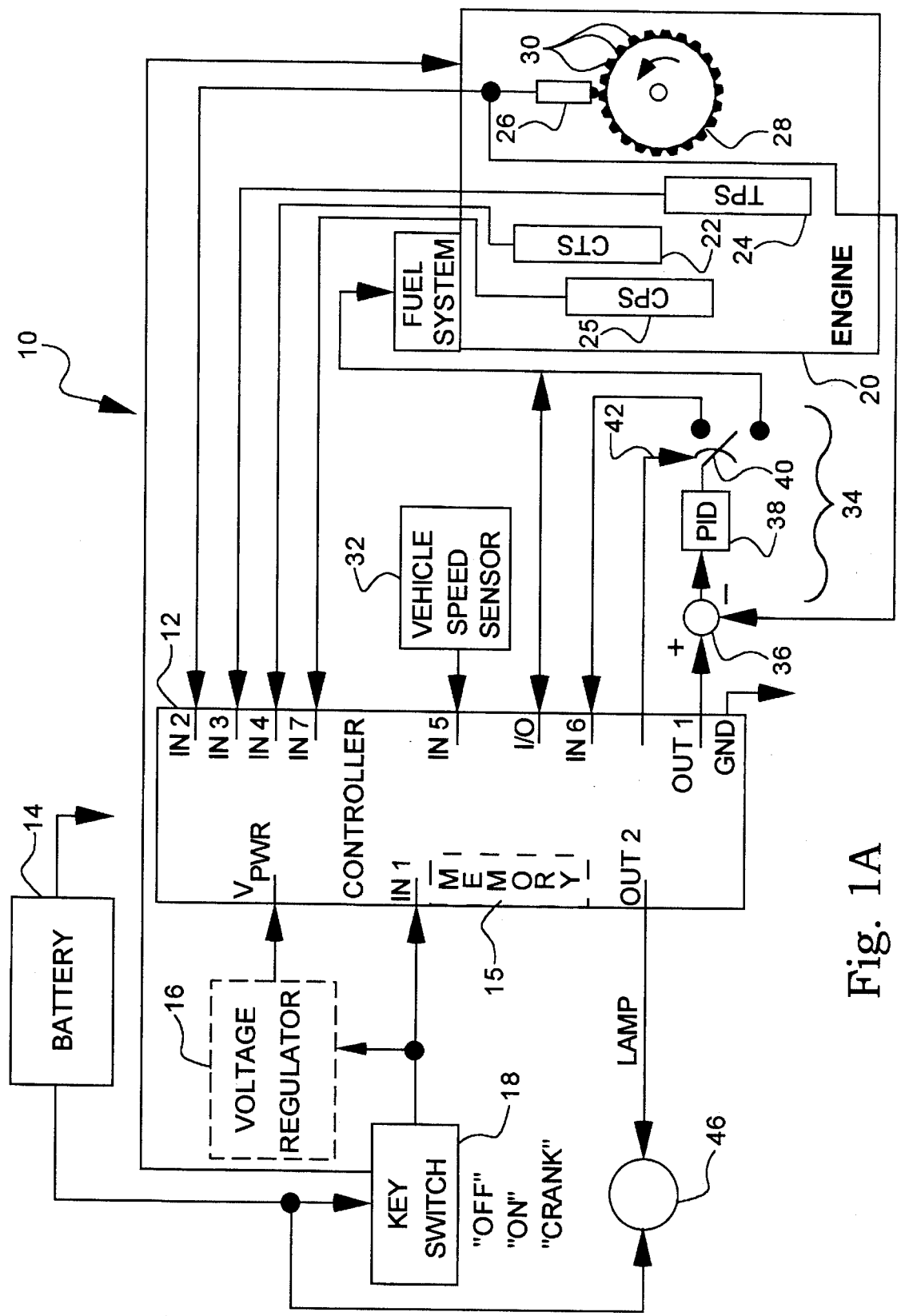
FIG. 1A is a block diagram illustration of an engine misfire detection system in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1A, a diagrammatic illustration of a microprocessor controlled engine misfire detection system 10, in accordance with one embodiment of the present invention, is shown. The system 10 includes as its central component a controller 12. Controller 12 is a microcomputer including at least a microprocessor portion, a power supply portion, an analog-to-digital convertor portion, and a memory portion.

The microprocessor portion runs software routines and manages the overall operation of the system 10. In a preferred embodiment, microprocessor portion 42 of controller 12 is a Motorola 68336 microprocessor.

The memory portion 15 of controller 12 may include ROM, RAM, EPROM, EEPROM, Flash PROM and any other reusable type of memory known to those skilled in the art. The memory portion of controller 12 may be further supplemented by external memory connected thereto (not shown). The external memory may include any of the memory features described with respect to the controller memory portion. An external memory may also be used to supplant the memory portion of controller 12 if controller 12 lacks a memory portion, or if the memory portion provides inadequate storage. Finally, the microprocessor portion may include sufficient memory (including ROM and RAM) to obviate the need for an additional controller memory portion or external supplemental memory.

The power supply portion of controller 12 receives electrical power at input $V_{PWR}$ from key switch 18 either directly, in which case controller 12 includes a voltage regulator portion, or via an external voltage regulator 16 as shown in phantom. In either case, a voltage regulating function should be provided to supply controller 12 with an appropriate power level for logic-level operation.

The battery 14 provides battery voltage to key switch 18 and lamp 46. Driver warning device 46 is, in turn, connected to output OUT2 of controller 12. Driver warning device 46 is preferably a lamp, as will be more fully discussed hereinafter, and should be positioned such that it may be viewed by the driver when operating the vehicle. Preferably, lamp 46 is mounted on or near the instrument panel of the vehicle. Although the preferred embodiment of driver warning device 46 is a lamp, driver warning device 46 may be any device suitable for providing a warning to the vehicle operator of a detected event. The present invention thus contemplates that driver warning device 46 may include any visually illuminating device, flashing or otherwise, such as a lamp, led, fiber optic system or the like, or any audible alarm such as a buzzer, bell, horn, recorded or synthesized voice, or the like.

Typically, battery voltage is approximately 12–14 volts, but the system 10 of the present invention must be operable with battery voltages as low as 7 volts and as high as 24 volts. Key switch 18 is a three-position switch having an "off" position, an "on" position and a "crank" position. In the "off" position, key switch 18 disconnects battery voltage from the controller 12. In the "on" position, key switch 18 supplies battery voltage to the controller 12. In the "crank" position, key switch 18 further supplies battery voltage to an engine starting system (not shown) in order to start the engine. The three key positions, or states, described above for key switch 18 correspond to those normally encountered in a motor vehicle wherein the key switch is initially switched from the "off" position to the "run" position to supply power to the electrical system of a vehicle, and upon further rotation of the switch to the "crank" position, a starter solenoid of the vehicle is engaged to start the engine. A key switch signal, corresponding to the status of key switch 18, is provided to controller 12 at input IN1. Although the key switch 18 just described is used in a preferred embodiment, the present invention contemplates other switch means for accomplishing the key switch function. For example, a "software key", or software controlled system, may be used to actuate a system of relays or other switches in order to supply battery voltage to the necessary electrical components.

In addition to the switched battery voltage supplied to the controller 12 through the key switch 18, signals corresponding to coolant temperature, throttle position, vehicle speed, engine speed and engine fueling are supplied to inputs of controller 12.

As part of the engine 20, a coolant temperature sensor 22 is provided for sensing the temperature of liquid coolant within the engine's cooling system (not shown), and providing a coolant temperature signal to input IN4 of controller 12. A throttle position sensor 24 is also provided for sensing the position of the engine's throttle position, and providing a throttle position signal to input IN3 of controller 12. As is common in the art, coolant temperature sensor 22 and throttle position sensor 24 provide analog signals to controller 12 which are converted therein to digital signals by an analog-to-digital convertor portion. Alternatively, one or more external analog-to-digital convertors may be provided to convert the various analog sensor signals to digital signals for use by the microprocessor portion of controller 12.

An engine speed sensor 26 provides an engine speed signal to controller 12 at input IN2. Engine speed sensor 26 is preferably a variable reluctance sensor positioned in close proximity to a gear 28 of, for example, the crankshaft, as is common in the automotive industry. Gear 28 includes a plurality of teeth 30 positioned equiangularly thereabout. In operation, engine speed sensor 26 detects the passage of teeth 30 thereby and provides a corresponding signal to controller 12. Controller 12 then computes engine speed from the engine speed signal as is known in the art.

A CAM position sensor 25 provides a cam position signal to controller 12 at input IN7. CAM position sensor 25, like engine speed sensor 26, is preferably a variable reluctance sensor. As is common in the automotive industry, a cam shaft gear is typically provided on the cam shaft and has a plurality of teeth thereon (not shown). CAM shaft position sensor 25 is placed in close proximity to the cam shaft gear to sense the passage thereby of teeth as previously described with respect to engine speed sensor 26. As is known in the art, a particular tooth of the cam shaft gear (not shown) is positioned so that its passing by CAM position sensor 25 indicates a new engine cycle. Since the CAM position sensor 25 signal is synchronized with the engine speed sensor 26 signal, the occurrence of the combustion stroke of each cylinder can thereby be determined as known in the automotive industry. This reference information is critical in a fuel injected system 44 since fuel injectors (not shown) require precise timed signals supplied thereto in order to appropriately control fuel injection quantities as well as timing of fuel injection with respect to the operation of a diesel engine.

A vehicle speed sensor 32 provides a vehicle speed signal to input IN5 of controller 12. As with engine speed sensor 26 and CAM position sensor 25, vehicle speed sensor 32 is preferably a variable reluctance sensor which senses rotational speed of a gear, or tone wheel, connected to the vehicle tail shaft, for example. In either case, however, engine speed sensor 26, CAM position sensor 25 and vehicle speed sensor 32 are analog sensors and thereby provide analog signals to controller 12. As with the coolant temperature sensor 22 and throttle position sensor 24, the engine speed signal, CAM position signal and vehicle speed signal are received by an analog-to-digital convertor portion of controller 12 to convert the signals to digital signals usable by controller 12. One or more analog-to-digital convertor may alternatively be provided external to controlled 12 for converting the sensor signals to digital signals.

Although sensors 22, 24, 25, 26 and 32 are preferably analog sensors known in the automotive art, the present invention also contemplates using sensors that supply digital signals corresponding to the sensed parameter in order to accomplish the above-described functions. In so doing, the analog-to-digital convertor portion of controller 12 (or alternatively, one or more external analog-to-digital convertors) is no longer necessary and may be omitted. The present invention further contemplates using redundant sensors within the system 10 so that the system 10 may remain fully operational while awaiting service on the failed or faulty sensor.

A fuel control system 34 provides fuel signals to fuel system 44 to thereby control fuel injection quantities as well as timing of fuel injection into engine 20. As is typical within the diesel engine industry, a fuel command input signal, corresponding to a "set speed" signal, is supplied by controller 12 at output OUT1 in accordance with a desired fuel delivery curve stored within the memory portion 15 of controller 12. The fuel command input is supplied to a positive node of a summing circuit 36, and the engine speed signal from engine speed sensor 26, corresponding to actual engine speed, is supplied to a negative node of the summing circuit 36. The output of the summing circuit 36, corresponding to [set speed—actual speed], is supplied to a proportional-integral-derivative (PID) controller 38 which provides the fueling signal to the fuel system 44 of the engine 20 under normal conditions. The operation of fuel control system 34 is known in the automotive industry and will not be discussed further.

A switch 40 is supplied at the output of PID 40 for directing, in a first switch position, the fueling signal supplied by the PID to the fueling system 44. In this position, the fueling signal is supplied as an input to controller 12 at input I/O. In a second switch position, the fueling signal supplied by the PID is directed to input IN6 of controller 12. The fueling signal received at IN6 is thereafter altered, as will be fully discussed hereinafter, and provided to fueling system 44, in altered form, via output I/O. Port I/O of controller 12 may thus be configurable as either an input or an output, depending upon the position of switch 40. Alternatively, port I/O may be provided as a separate input and output for performing the associated function. Finally, output OUT3 is connected to switch actuator 42 for controlling the position of switch 40.

Figure 1B:
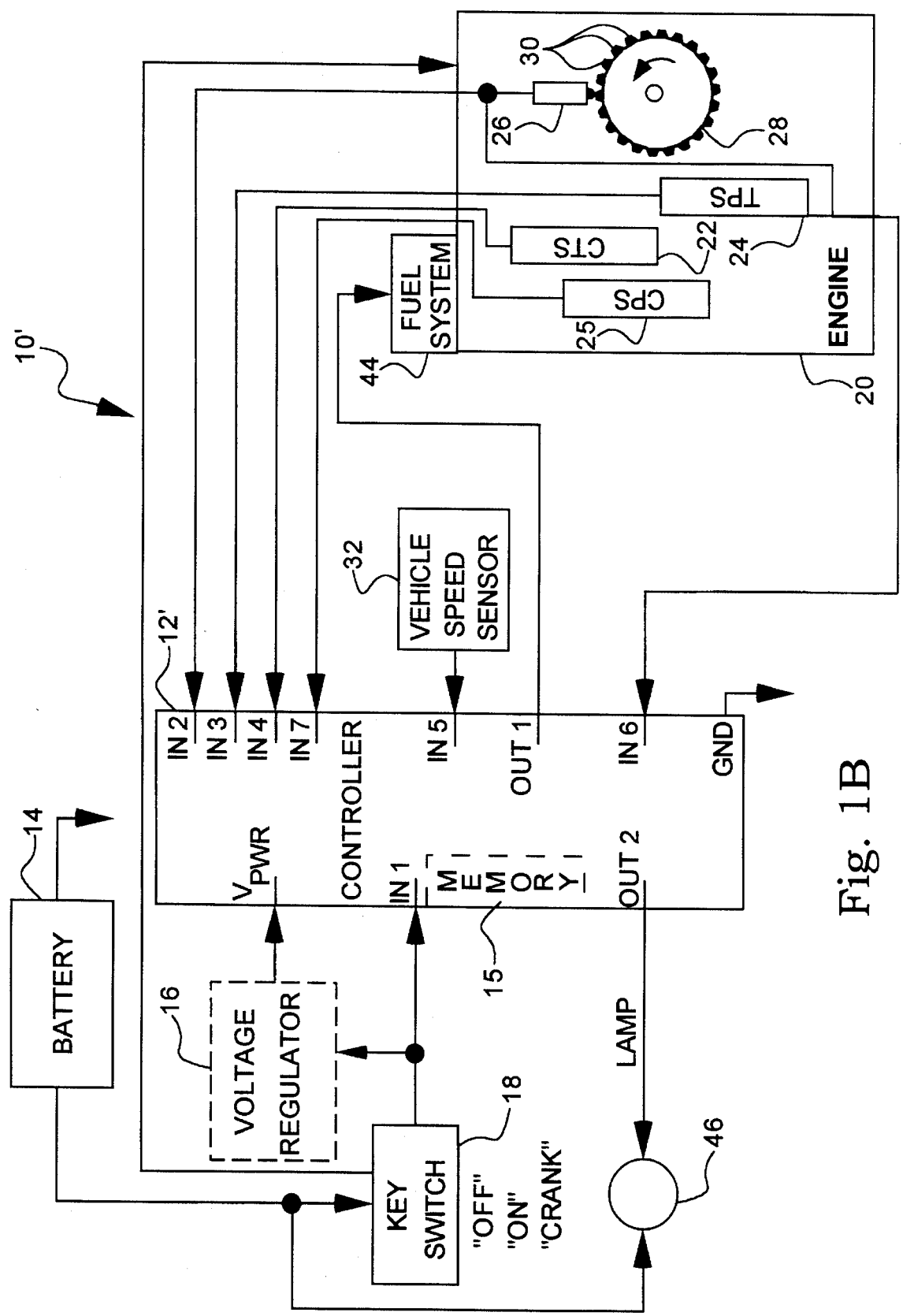
FIG. 1B is a block diagram illustration of an engine misfire detection system in accordance with another embodiment of the present invention.

Referring now to FIG. 1B, another embodiment of a microprocessor controlled engine misfire detection system 10' is shown. The system 10' is identical in all respects to system 10 of FIG. 1A except that controller 12' includes the fuel control system 34. Thus, controller 12' includes, as a software function, summer 36, PID 38 and switch 40 as shown in FIG. 1A. In normal operation, controller 12' supplies the fueling signal dem_fuel directly to the fuel system 44 of the engine 20. Input IN6 of controller 12' receives the engine speed signal from the engine speed sensor 26 and uses this signal in the summing function previously described with respect to the summing circuit 36 of FIG. 1A. In system 10', all fueling signals are computed and supplied by one or more fueling algorithms executed by controller 12'. In this embodiment, the need for a physical switch, such as switch 40 of FIG. 1A, is obviated since this switch function is controlled by software.

In operation, the system 10 (or 10') executes a software program several times a second to perform a cylinder misfire test in accordance with the present invention. However, the underlying concept of the program is that it is, in actuality, a "fire" test as opposed to a "misfire" test. That is; when the test is enabled a cylinder is supplied with a quantity of fuel in excess of that demanded by the cylinder, and is thereafter monitored for an expected increase in engine speed attributable to the particular cylinder. If the engine speed response has not increased in accordance with the excess quantity of fuel supplied to the cylinder within a predetermined number of engine cycles, a misfire condition is detected therein. Each of the cylinders are so tested in sequence. If a misfire condition has been detected, the test is re-executed after a predetermined test repeat delay time period. If a misfire condition is detected a predetermined number of sequential times, a temporary flag is set within memory 15 of controller 12. Finally, if a misfire condition is detected a predetermined number of sequential times for a predetermined number of sequential driving cycles, or trips, the driver warning device 46 is activated.

The misfire algorithm of the present invention executes once per driving cycle (trip). The algorithm overfuels an individual cylinder and measures the change in crankshaft speed. If the speed of the overfueled cylinder is greater than the previous two cylinders' speeds, the cylinder is assumed to be functioning properly and all other cylinder is tested. If all cylinders pass the test, the test is terminated for the remainder of the trip.

Ideally, the misfire test should be run while the engine is warm and idling, and the vehicle is at rest so as not to interfere with vehicle operation. The amount of additional fuel supplied in accordance with the test should not be enough to increase emissions or noticeably change the idle speed of the engine. Prior to executing the misfire test, switch 40 of system 10 is in its first position so that the fuel control system 34 provides the fueling signal dem_fuel, corresponding to the quantity of fuel demanded by the engine, to the fuel system 44. In system 10', dem_fuel is supplied directly to fuel system 44 at OUT1 of controller 12'.

In order to commence the misfire test, several test enabling conditions must be true for a calibratible time period, or test delay time period, to enable the engine to reach a steady state operating condition. Thus, after detecting an ignition signal, a test delay counter is reset within controller 12 and the test enabling conditions are monitored. Preferably, the test delay time period is approximately 3.0 seconds, although the present invention contemplates test delay time periods of between approximately 1.0 and 60 seconds.

The first test enabling condition that must be satisfied prior to executing the misfire test is that the overall engine speed (computed over at least one full revolution of gear 28), sensed by the engine speed sensor 26, must be less than a maximum idle speed. Preferably, the maximum idle speed is set at approximately 720 RPM, although the present invention contemplates maximum idle speeds between approximately 500 and 1000 RPM.

The second test enabling condition that must be satisfied prior to executing the misfire test is that the vehicle speed, sensed by vehicle speed sensor 32, must be less than or equal to a maximum vehicle speed. Preferably, the maximum vehicle speed is approximately 0.0 mph, although the present invention contemplates maximum vehicle speeds of between approximately 0.0 and 128 mph.

The third test enabling condition that must be satisfied prior to executing the misfire test is that the coolant temperature, sensed by coolant temperature sensor 22, must be above a minimum coolant temperature Preferably, the minimum coolant temperature is approximately 140° F., although the present invention contemplates minimum coolant temperatures of between approximately −40° F. and 255° F.

The fourth test enabling condition that must be satisfied prior to executing the misfire test is that the fuel command quantity, corresponding to the fuel command input signal dem_fuel must be below a maximum fuel quantity. Preferably, the maximum fuel quantity is approximately 15 mm', although the present invention contemplates maximum fuel quantities of between approximately 0.0 and 60 $mm^3$.

The fifth test enabling condition that must be met prior to executing the misfire test is that the throttle position, sensed by throttle position sensor 24, must be less than or equal to a maximum throttle position. Preferably, the maximum throttle position is approximately 0.0 percent of maximum throttle, although the present invention contemplates maximum throttle positions of between approximately 0.0 and 100 percent of maximum throttle.

The sixth test enabling condition that must be met prior to executing the misfire test is that the fuel control system 34 of system 10, including the fuel system 44, must not have any active faults associated therewith. Within fuel control system 34 and fuel system 44, certain fault conditions may exist such as failure to provide a valid engine speed signal to the negative node of summing circuit 36, failure of the proportional-integral-derivative controller 38, and the like. Although not shown in detail in FIG. 1A, it is to be understood that such fault potential fault conditions within fuel control system 34 and fuel system 44 are monitored and detectable by controller 12. Within system 10', similar fuel system faults may occur, although certain ones of the faults may be internal to controller 12'.

The seventh, and final, test enabling condition that must be met prior to executing the misfire test is that the coolant temperature sensor 22, throttle position sensor 24, engine speed sensor 26 and vehicle speed sensor 32 must not have any sensor faults associated therewith. Each sensor has associated therewith a mechanism for indicating one or more fault statuses associated with the particular sensor. For example, it is commonplace with a temperature sensor, that if a temperature reading is excessively (out of range) low, such a reading is indicative of an open-circuited sensor. Similarly, an excessively high (out of range) temperature reading is indicative of a short-circuited sensor. Each of the sensors 22, 24, 26 and 32 have such a mechanism for indicating the fault status of the particular sensor. Although not shown in detail in FIGS. 1A and 1B, the present invention further contemplates that each, or any of, the sensors 22, 24, 26 and 32 may have one or more fault status lines connected to controller 12 (or 12') for directly monitoring corresponding sensor fault conditions.

Once each of the foregoing seven test enabling conditions have been met for at least the test delay time period, the misfire test may commence. If, during execution of the misfire test, or prior to commencing execution of the test, any of the foregoing seven test conditions is not longer met, the test delay timer is reset and the misfire test is terminated until each of the seven conditions is again met for at least the test delay time period.

Although a preferred embodiment of the misfire test requires each of the foregoing seven test enabling conditions to be satisfied for the misfire test to either commence or continue, it is to be understood that such test enabling conditions represent only one preferred embodiment of the misfire test of the present invention and should therefore not be considered to be limiting. In fact, the present invention contemplates alternate embodiments of the misfire test wherein any one, or any combination of, the foregoing test enabling conditions must be met prior to executing the misfire test of the present invention.

Once all test enabling conditions have been met for at least the test delay period, the controller 12 of system 10 will actuate switch 40 from its first position to its second position to thereby provide the fueling signal from the fuel control system 34 to the controller 12 at input IN6. The misfire test will then commence to test each cylinder, one at a time, in a predetermined sequence. In executing the misfire test for a particular cylinder, controller 12 will supply an altered version of the fueling signal, established by the fuel control system 34 in accordance with the quantity of fuel demanded by the engine cylinder, to the fuel system 44 via output I/0. Alternatively, controller 12' of system 10' simply supplies the altered version of the fueling signal, under software control, to fuel system 44 at OUT1 thereof.

Although the actual order of cylinders in the test sequence may be arbitrary, a preferred test sequence for a six cylinder engine tests the cylinders in numerical order 1–6. When a particular cylinder has completed a misfire test, regardless of whether it passes or fails, the next cylinder in the sequence is tested after the engine has run a misfire test delay number of engine cycles to ensure that the engine has returned to a steady state condition, and the overfueling of one cylinder does not affect the outcome of another cylinder test. Preferably, the misfire test delay number of engine cycles is approximately 5, although the present invention contemplates a misfire test delay number of between approximately 0 and 255.

The cylinder test for each cylinder will be executed up to a test cycle number of engine cycles. If the cylinder under test passes the misfire test before the test number of engine cycles, the test is terminated for that cylinder and the next cylinder in the sequence is tested after a misfire test delay number of engine cycles. Preferably, the test cycle number of engine cycles is approximately 10, although the present invention contemplates a test cycle number of engine cycles between approximately 0 and 255.

In executing the misfire test, the fuel quantity to the test cylinder is a modified version of the fueling signal dem_fuel, corresponding to the quantity of fuel demanded by the cylinder. In either system 10 or 10', controller 12 (or 12') modifies the fueling signal according to the equation Altered_Fuel=dem_fuel * Fuel_Multiplier, and supplies this quantity of fuel to fuel system 44 to effectuate the misfire test. Fuel_Multiplier is defined be the equation Fuel Multiplier=Initial_Fuel_Multiplier+(Ramp * Engine_Cycle Number), where Engine_Cycle_Number is the number of engine revolutions since the beginning of the cylinder test and thus ranges between 0 and test cycle number of engine cycles. Preferably, Initial_Fuel_Multiplier is set at approximately 30, although the present invention contemplates Initial_Fuel Multiplier values of between approximately 0 and 100. Ramp is preferably set at approximately 0.2, although the present invention contemplates Ramp values of between approximately 0.01 and 10.0.

Figure 2:
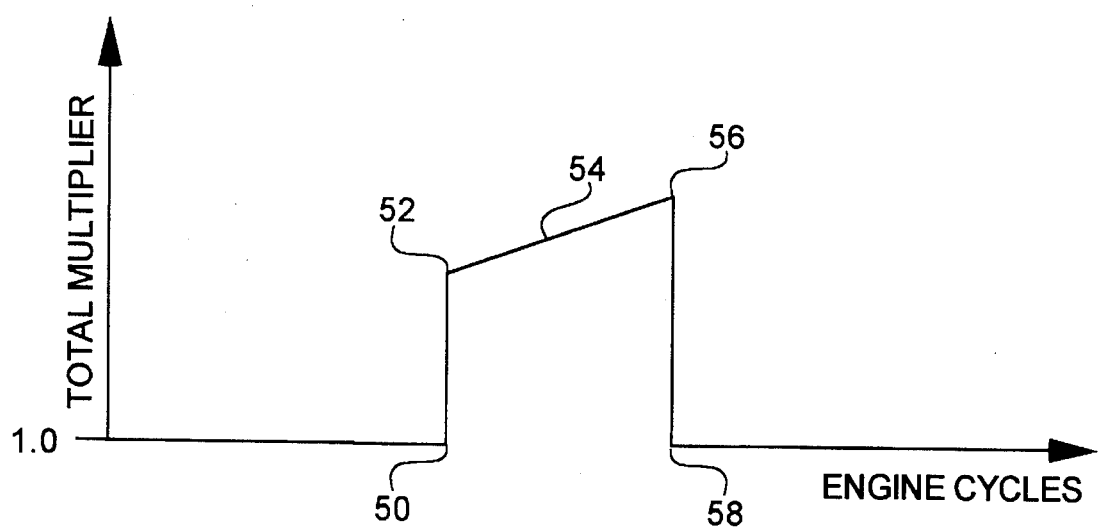
FIG. 2 is a plot of fuel multiplier versus engine cycles illustrating a ramped increase in fuel to a particular cylinder under test.

Referring now to FIG. 2, Fuel_Multiplier is shown plotted versus engine cycles. At the commencement of a misfire test, Engine_Cycle_Number 50 is zero and Fuel_Multiplier 52 is therefore equal to Initial_Fuel_Multiplier. As the misfire test continues, the Fuel_Multiplier value increases at a rate 54 defined by Ramp*Engine_Cycle_Number. If the cylinder under test does not pass the misfire test, the last Fuel Multiplier value 56 will correspond to test cycle number of engine cycles 58. If, however, the cylinder passes the misfire test before test cycle number of engine cycles 58, controller 12 will stop overfueling the current cylinder, fuel all cylinders in accordance with engine demand for the next misfire test delay number of engine cycles, and begin testing the next cylinder in the test sequence.

As the cylinder under test is being overfueled, in accordance with the foregoing equations, have engine speed of the cylinder under test is monitored for an expected increase in engine speed. Thus, the engine speed used in this comparison must be optimized for the combustion of each cylinder. To accomplish this with the engine speed detection arrangement discussed above, it is desirable to measure engine speed from a predetermined crank angle after TDC of the cylinder under test to a predetermined crank angle after TDC of the next cylinder in the firing sequence. In a preferred embodiment having a 6 cylinder engine with a cylinder firing order of 6-2-4-1-5-3, and a 36 tooth gear 28 (FIG. 1), with tooth 31 corresponding to tooth 0, there will be a tooth every 10° and the predetermined crank angle will be approximately 20°. Therefore, the engine speed of cylinder #1 (and #6) will be the engine speed between tooth 2 and tooth 14. Likewise, engine speeds for cylinders #5 and #2 will be between tooth 14 and tooth 26. Finally, engine speeds for cylinders #3 and #4 will be between tooth 26 and tooth 2. It is to be understood, however, that the present invention contemplates alternative methods and devices for detecting the engine speed of a particular engine cylinder, the importance of such an engine speed detection arrangement lying in its ability to measure the engine speed during a portion of the combustion stroke of each engine cylinder.

Figure 3:
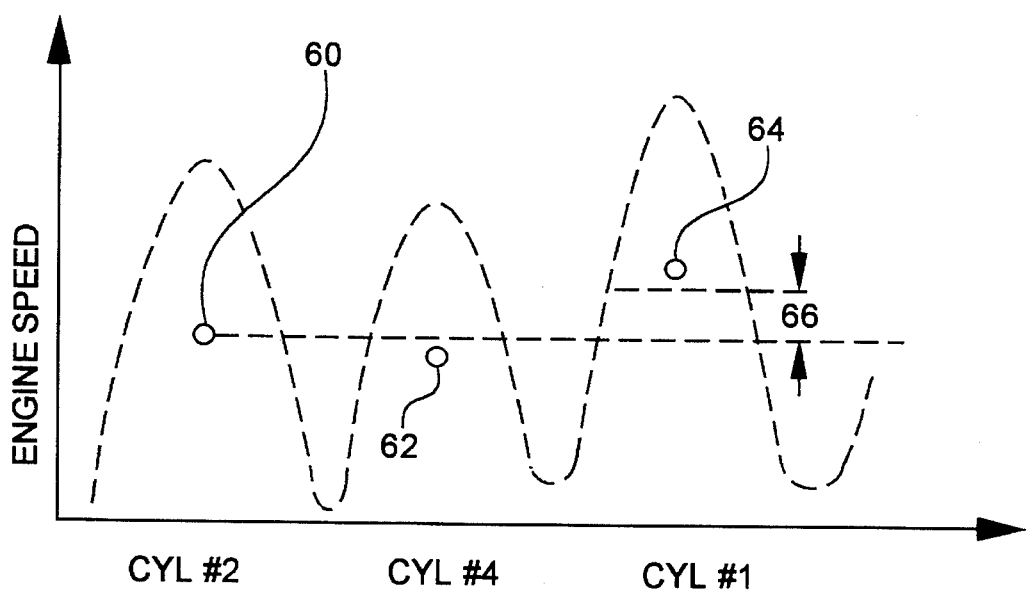
FIG. 3 is a plot of engine speed for three cylinders in a firing sequence wherein the last cylinder is the cylinder under test.

Referring now to FIG. 3, the engine speed of the cylinder under test is preferably compared against the engine speed of the previous two cylinders in the firing order to determine whether the engine speed of the cylinder under test is sufficiently responding to the extra fuel supplied thereto. If the difference between the overfueled cylinder speed and the fastest of the two previous cylinders in the firing order exceeds a delta speed value. Preferably, the delta speed value is approximately 3.0 RPM, although the present invention contemplates delta speed values of between approximately 0 RPM and 32 RPM. Alternatively, the engine speed of the cylinder under test may be compared to any one, or combination of, previous cylinders in the firing order. In the embodiment shown in FIG. 3, instantaneous engine speed is shown for three cylinders in a firing order wherein cylinder #1 is the cylinder under test. The engine speed 60 of cylinder #2, determined by the arrangement described above, is greater than the engine speed 62 of cylinder #4. Thus, the engine speed 64 of the cylinder under test, cylinder #1, is compared to the engine speed 60 of cylinder #2. Since the engine speed 64 exceeds engine speed 60 by more than delta speed 66, cylinder #1 has passed the misfire test. Once a cylinder under test has passed the misfire test, the fuel quantity supplied to the cylinder is returned to normal, and the misfire test is performed on the next cylinder in the firing order after a misfire test delay number of engine cycles. If the difference between the overfueled cylinder's speed and the speed of the fastest of the two previous cylinders in the firing order does not exceed the delta speed value within test cycle number of engine cycles, then the cylinder fails the misfire test.

Figure 4:
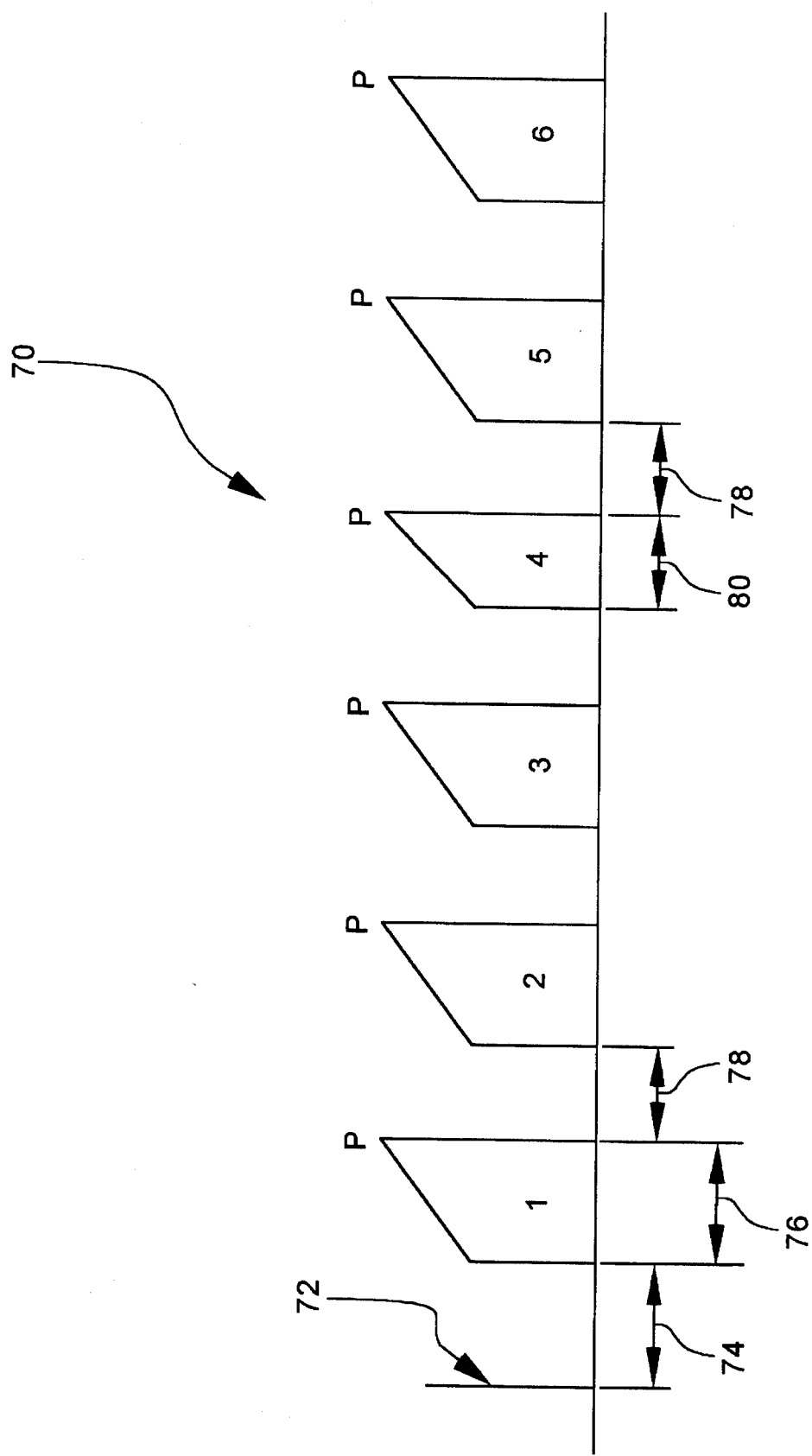
FIG. 4 is a misfire test timeline plot illustrating various misfire test timing parameters.

Referring now to FIG. 4, a misfire test timeline 70 is shown illustrating the various misfire test timing parameters in a situation wherein all 6 cylinders of a 6-cylinder engine lave passed the misfire test. In timeline 70, time marker 72 represents the point in time, after the engine has been started, that all misfire test enabling conditions have been met. At time marker 72, the test delay timer within controller 12 (or 12') is reset to zero. After a test delay time period 74 since resetting the test delay timer, wherein all misfire test enabling conditions have continued to be met, the misfire test, as described above, is commenced on the first cylinder in the sequence of cylinders to be tested. Cylinder #1 (as with cylinder #s 2, 3, 5 and 6) is shown as having passed the misfire test at the last engine cycle 76 of the misfire test (test cycle number engine cycles). After misfire test delay number of engine cycles 78, the misfire test is commenced on the next cylinder in the sequence of cylinders to be tested. Cylinder #4 is shown as having passed the misfire test at an engine cycle number 80 less than test cycle number of engine cycles. Regardless of the engine cycle number at which the cylinder passes the misfire test, however, the next cylinder in the test sequence is not tested until after misfire test delay number of engine cycles 78.

Figure 5:
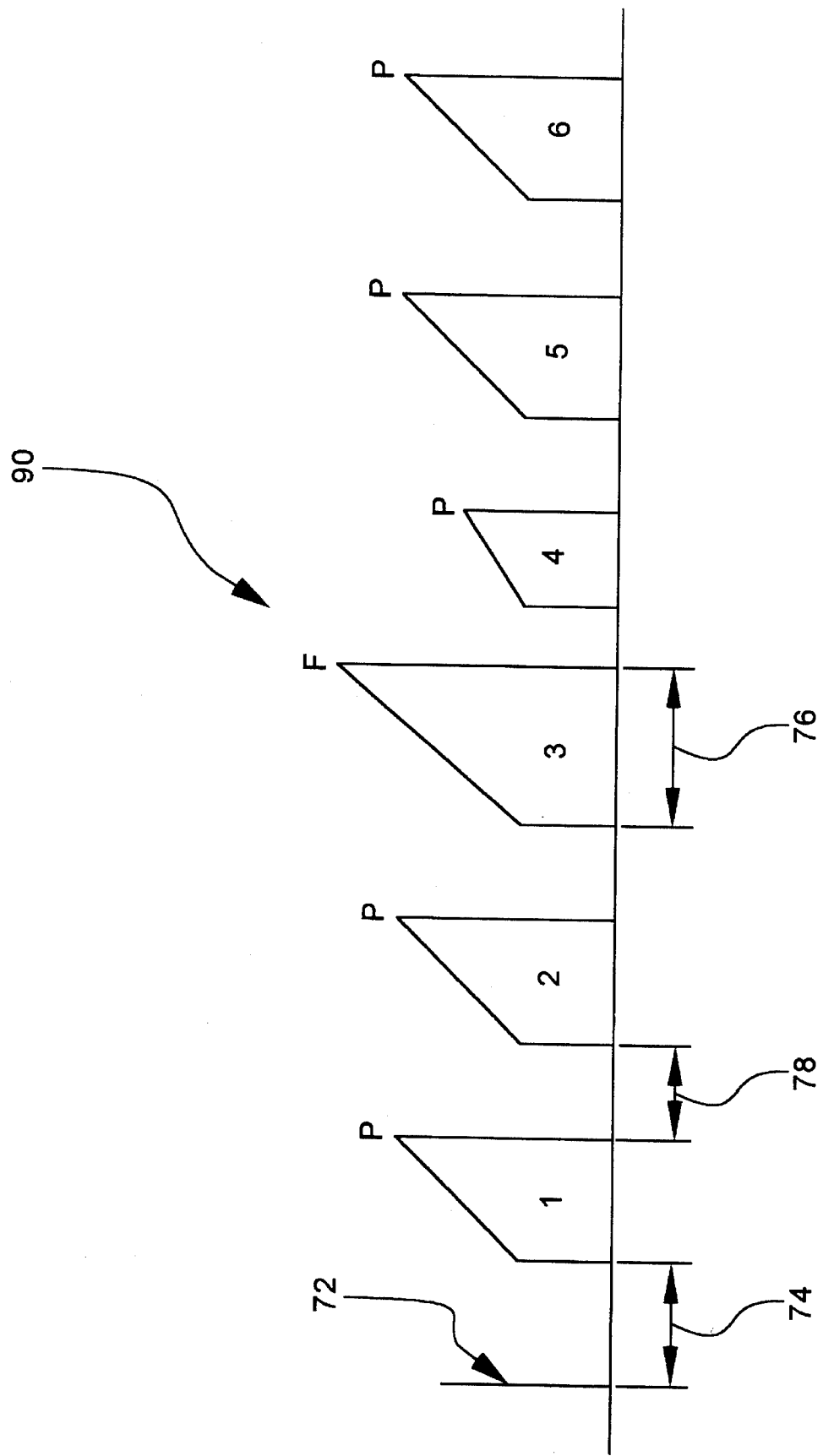
FIG. 5 is a misfire test timeline plot illustrating a misfire condition detected in cylinder 3.

Referring now to FIG. 5, a misfire test timeline 90 is shown illustrating the various misfire test timing parameters in a situation wherein all but cylinder #3 in a 6-cylinder engine have passed the misfire test. In timeline 90, time marker 72 and time spans 74 and 78 are identical to the identically numbered events described in connection with FIG. 4 and will therefore not be discussed further. Cylinder #s 1, 2 and 4–6 are shown as having passed the misfire test within test cycle number engine cycles. Cylinder #3, however, is shown as having failed the misfire test at an engine cycle number 76 equal to test cycle number of engine cycles.

Figure 6:
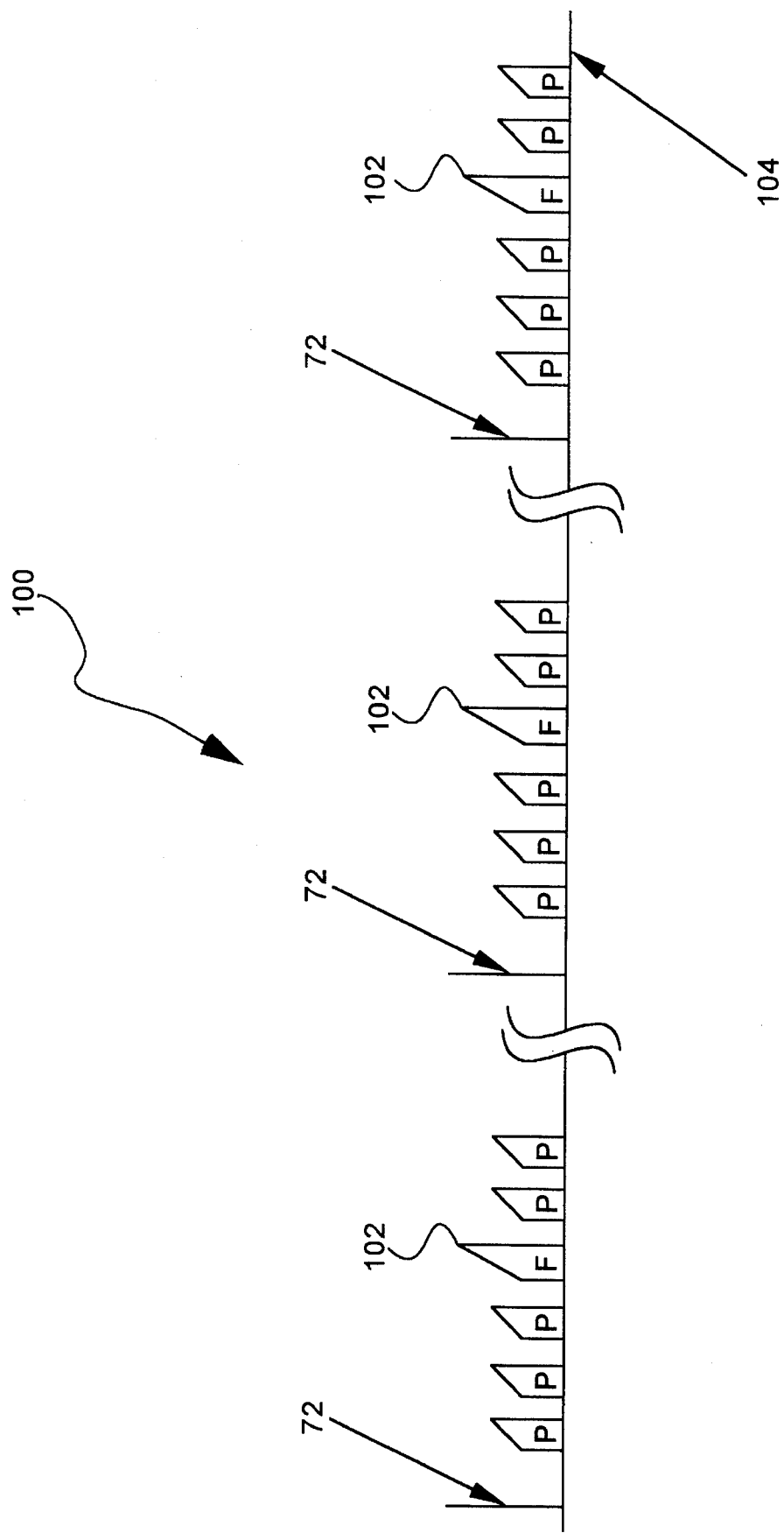
FIG. 6 is a misfire test timeline plot illustrating a test failure sequence leading to the logging of a temporary fault flag.

If all cylinders pass the misfire test, then controller 12 (or 12') sets a test_pass flag within memory 15 and the misfire test is disabled until the next driving cycle (next detection of an ignition signal at input IN1). If any of the cylinders tested fail the misfire test, then controller 12 (or 12') sets a test_fail flag within memory 15. If more than one cylinder tested fails the misfire test, then controller 12 (or 12') also sets a multiple_cylinders misfiring flag within memory 15. Preferably, if either misfire test failure condition occurs, the misfire test is re-run from the beginning (ie. performing the misfire test after first making sure all test enabling conditions are met for at least a test delay time period 74). The present invention contemplates that the misfire test can be so executed up to repeat number of times before actually declaring a misfire fault. Preferably repeat is set at approximately 3, although the present invention contemplates repeat values within the range of between approximately 0 and 16. FIG. 6 shows a misfire test timeline 100 illustrating repetition of the misfire test upon detecting a misfire condition 102 in cylinder #3, wherein repeat is set at 3. As shown in FIG. 6, if the misfire test fails for repeat times (3), controller 12 (or 12') logs an actual misfire fault by setting a temporary fault within memory 15 at time 104 in the timeline 100. Optionally, at time 104, controller 12 (or 12') may be programmed to capture snapshot data of the various fueling parameters, sensor readings, and the like. In any event, if the misfire test fails repeat times, the test is disabled until the next driving cycle (next ignition detection at input IN1).

Figure 7:
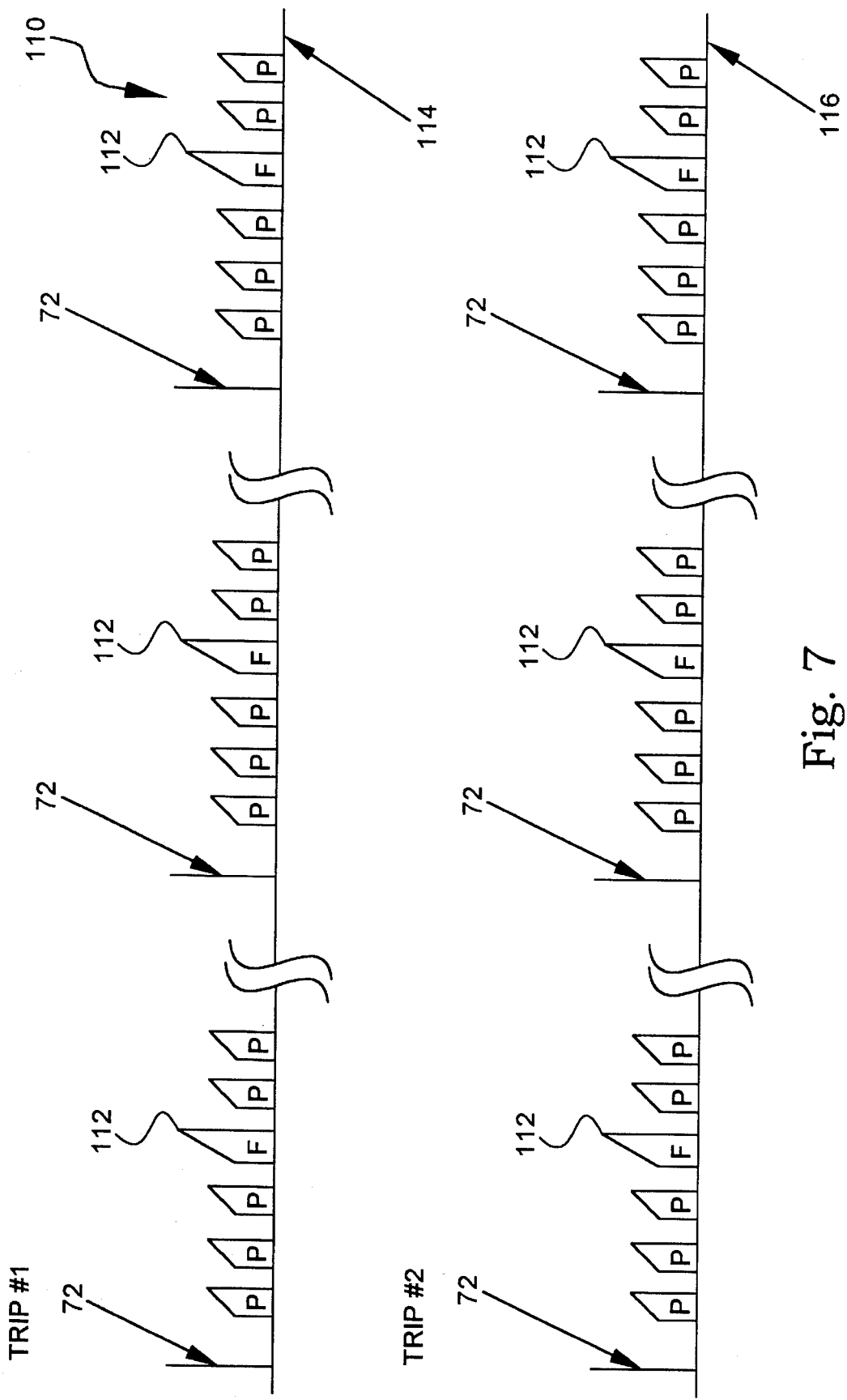
FIG. 7 is a misfire test sequence plot illustrating a test failure sequence leading to illumination of a driver warning lamp.

If a temporary fault was set on the previous driving cycle and the misfire test has again failed repeat number of times, controller 12 (or 12') activates the driver warning device 46. Preferably, driver warning device 46 is a lamp located within or near the instrument panel of the vehicle. FIG. 7 shows a misfire test timeline 110 illustrating this scenario wherein a misfire condition 112 is detected in three subsequent misfire tests of trip #1 so that a temporary fault is set at time 114 of timeline 110. In the next driving cycle (trip #2), a misfire condition 112 is again detected in three subsequent misfire tests. Thus, at time 116, controller 12 (or 12') activates lamp 46 to warn the driver of the misfire condition. As previously indicated, controller 12 (or 12') keeps track of the driving cycles (trips) by monitoring ignition signals at input IN1. Thus, a new driving cycle is assumed to have begun each time a key "on", or alternatively a key "crank" condition is detected.

The temporary fault and any snapshot data can be erased from memory 15 if no misfire condition has been detected during a first predetermined number of previous sequential driving cycles. Preferably, this first predetermined number is set at approximately 80, although the present invention contemplates setting the first predetermined number of previous sequential driving cycles between approximately 2 and 500. Finally, lamp 46 may be extinguished if no misfire condition has been detected during a second predetermined number of previous sequential driving cycles. Preferably, this second predetermined number is set at approximately 3, although the present invention contemplates setting the second predetermined number of previous sequential driving cycles between approximately 1 and 500.

Figure 8A:
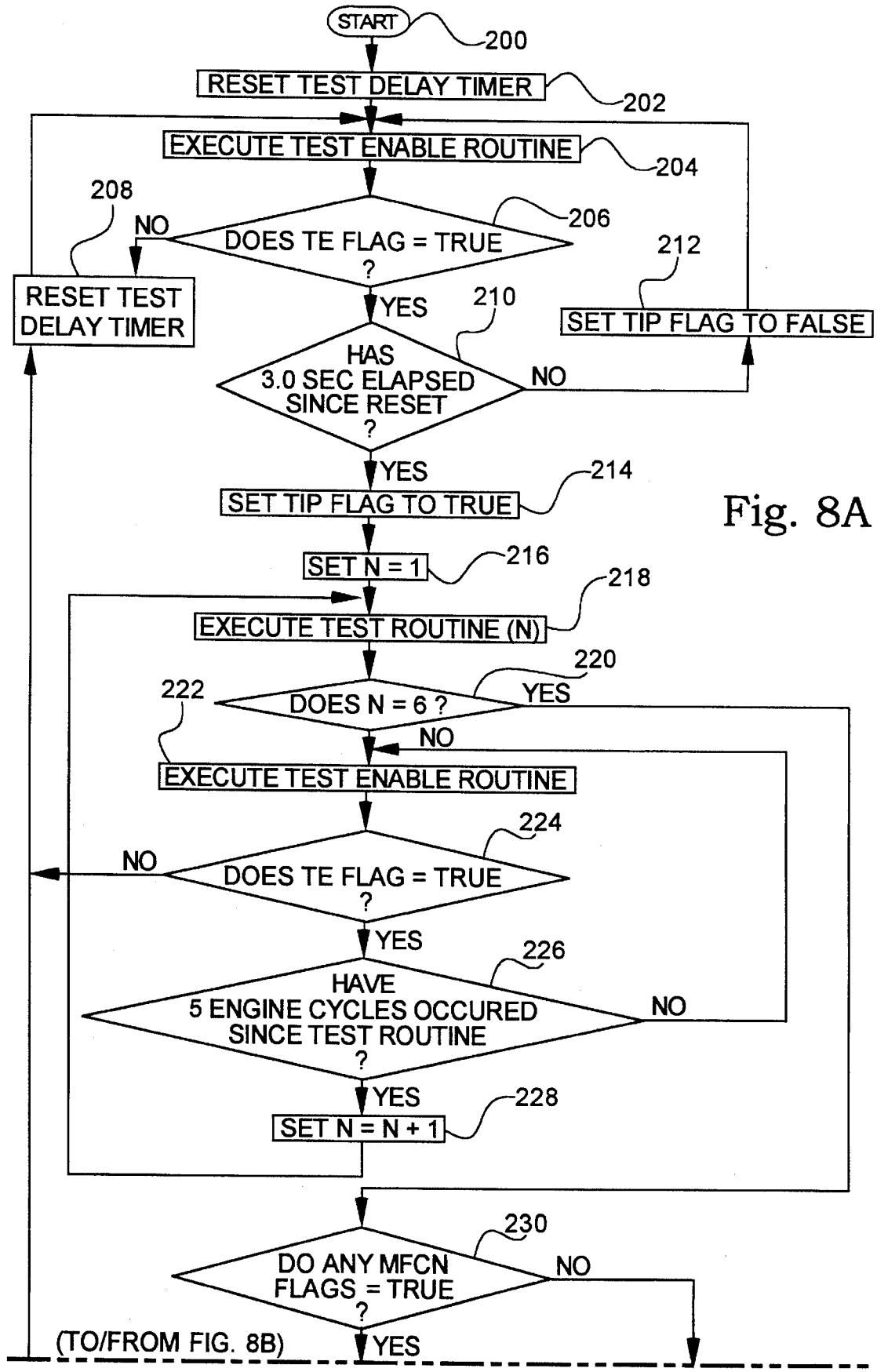
FIG. 8A is a flowchart of an engine misfire detection software algorithm executable by a controller of the engine misfire detection system of either of FIGS. 1A and 1B.

Referring now to FIG. 8A, an engine misfire detection algorithm, in accordance with another aspect of the present invention, is shown. The algorithm is executable by controller 12 (or 12') many times per second and starts at step 200. At step 202, the test delay timer is reset. Program execution continues at step 204 where the test enable routine 300 (FIG. 9) is executed. Upon returning from the test enable routine 300, program execution continues at step 206 where a test enable (TE) flag is tested. If the TE flag has been set to false by the test enable routine 300 (meaning that all test enabling conditions have not been met), the test delay timer is reset at step 208 and program execution continues again at step 204. If the TE flag has been set to true by the test enable routine 300, program execution continues at step 210 where the test delay timer is tested to determine whether 3.0 seconds have elapsed since resetting the test delay timer. If not, a test-in-progress (TIP) flag is set to false at step 212 and program execution continues again at step 204. If 3.0 seconds have elapsed since resetting the test delay timer, then program execution continues at step 214. The foregoing steps ensure that all test enabling conditions have been met for at least a test delay time period, preferably 3.0 seconds, before performing the cylinder misfire test.

At step 214, the TIP flag is set to true, indicating that the misfire test is in progress. Program execution continues at step 216 where a pointer N is set to the first cylinder to be tested; here cylinder #1. Program execution continues at step 218 by executing the misfire test routine 400 (FIG. 10) on cylinder N. Upon returning from the test routine 400, program execution continues at step 220 where the algorithm determines whether the test routine 400 just executed is for the last cylinder in the sequence of cylinders to be tested; here cylinder #6. If so, program execution continues at step 230. If the test routine 400 executed at step 218 was not for cylinder #6, program execution continues by executing the test enable routine 300 (FIG. 9) at step 222. Upon returning from the test enable routine 300 at step 222, the TE flag is tested at step 224. If, at step 224, the TE flag is not set to true, then the test delay timer is reset at step 208 and the algorithm continues again at step 204. If, at step 224, the TE flag is set to true, then the number of engine cycles since executing the test routine is tested at step 226. As previously indicated, a new engine cycle is preferably detected by sensing the passing of a tooth on the cam shaft gear by CAM position sensor 25. At any rate, if, at step 226, a test cycle number of engine cycles, here 5, have not occurred since executing the test routine at step 218, program execution continues at step 222. If, at step 226, 5 engine cycles have occurred since executing the test routine, the next cylinder ill the sequence of cylinders to be tested is identified at step 228; here by incrementing N by 1, and program execution continues at step 218.

If, at step 220, the algorithm determines that all cylinders in the sequence of cylinders to be tested have undergone the misfire test routine 400, the algorithm tests, at step 230, whether any cylinder misfires have been detected by testing the status of the misfire cylinder number (MFCN) flags, wherein N corresponds to the cylinder number. Thus, if cylinder #3 fails the misfire test routine 400, the MFC3 flag will be set to true. If, at step 230, any of the MFCN flags are true, indicating that at least one misfire condition has been detected, program execution continues at step 232. If, at step 230, none of the MFCN flags are true, indicating that all cylinders have passed the misfire test routine 400, program execution continues at step 252.

Figure 8B:
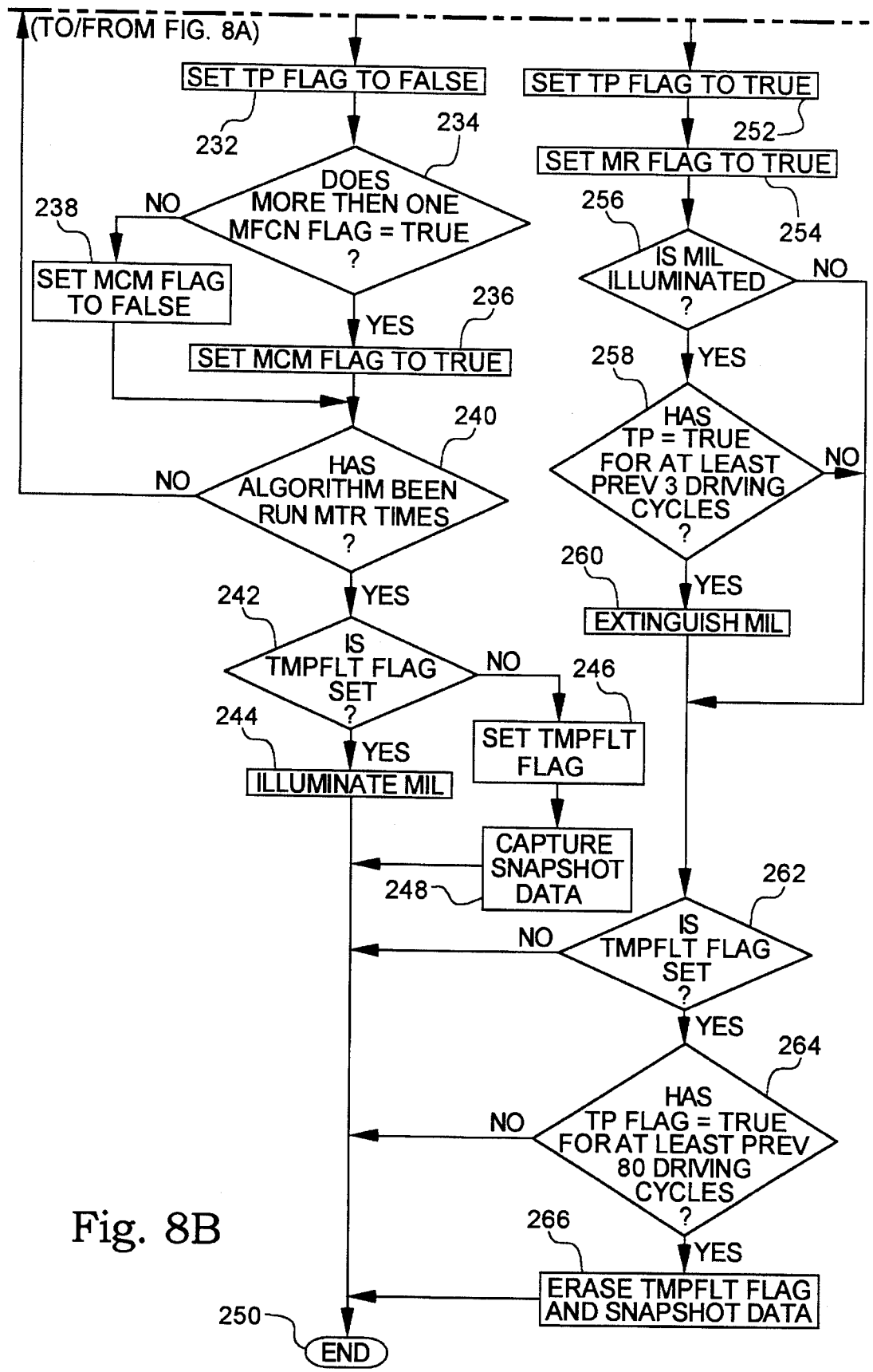
FIG. 8B is a continuation of the flowchart of FIG. 8A.

Referring now to FIG. 8B, if any of the MFCN flags were found to be set to true at step 230, a test pass (TP) flag is set to false at step 232, indicating that at least one of the engine cylinders has failed the misfire test routine 400. From step 232, program execution continues at step 234 where the algorithm tests whether more than one MFCN flag has been set to true within the misfire test routine 400. If more than one MFCN flag is set to true, a multiple cylinder misfire (MCM) flag is set to true at step 236. If, at step 234, only one MFCN flag was set to true, the MCM flag is set to false at step 238. If the MCM flag was set to true at step 236, or to true at step 238, program execution continues at step 240 where the algorithm tests whether it has been run misfire test repeat times. If the algorithm has not been run MTR (repeat) times at step 240, the test delay timer is reset at step 208 and program execution continues at step 204. If the algorithm has been run MTR times at step 240, the status of the temporary fault flag Tmpflt is tested at step 242. If, at step 242, the Tmpflt flag is set, the MIL (lamp 46) is illuminated at step 244. If, at step 242, the Tmpflt flag is not set, the Tmpflt flag is set at step 246 and snapshot data is captured at step 248. If snapshot data is captured at step 248, or if lamp 46 is illuminated at step 244, program execution terminates thereafter at step 250.

If, at step 230, none of the MFCN flags are true, the TIP flag is set to true at step 252, indicating that all cylinders have passed the misfire test routine 400. From step 252, a misfire readiness (MR) flag is set to true at step 254, indicating that the misfire algorithm should not be run again during the present driving cycle. From step 254, the algorithm continues at step 256 where the status of the MIL (lamp 46) is tested. If, at step 256, the MIL is illuminated, the TP flag is tested at step 258 to determine whether it has been set to true for at least the previous three driving cycles. If so, the MIL is extinguished at step 260. If, at step 256, the MIL is not illuminated, the TP flag has not been set to true for at least the previous three driving cycles at step 258, or the MIL is extinguished at step 260, the status of the Tmpflt flag is tested at step 262.

If, at step 262, the Tmpflt flag is not set, the algorithm is terminated at step 250. If, at step 262, the Tmpflt flag is set, the TP flag is tested at step 264 to determine whether it has been set to true for at least the previous 80 driving cycles. If so, the Tmpflt flag and all snapshot data is erased from memory 15 at step 266 and the program is terminated at step 250. If, however, the TP flag has not been set to true for at least the previous 80 driving cycles at step 264, the program is terminated at step 250.

Figure 9A:
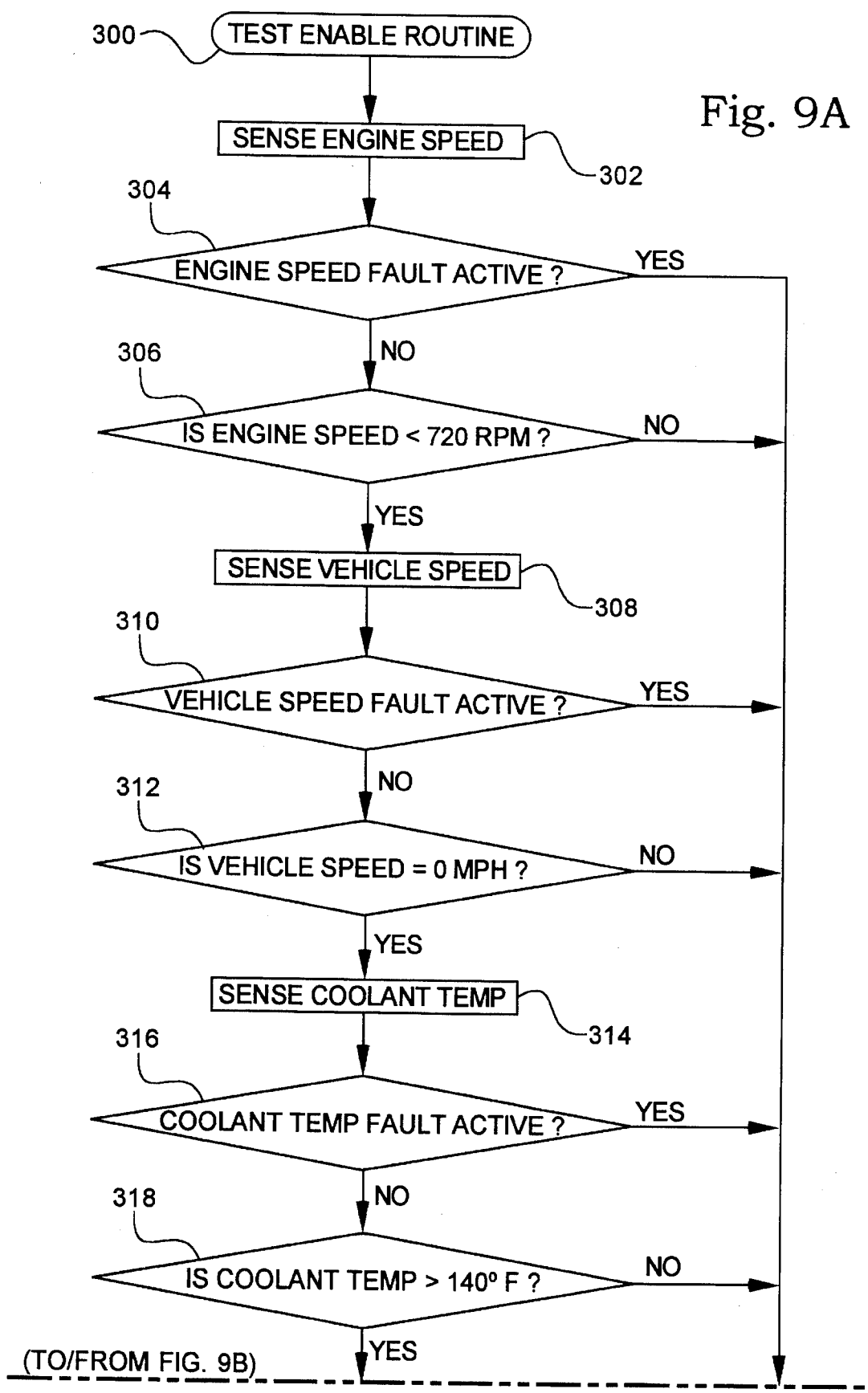
FIG. 9 is a flowchart of a test enable routine executable by the algorithm of FIGS. 8A and 8B.
Figure 9B:
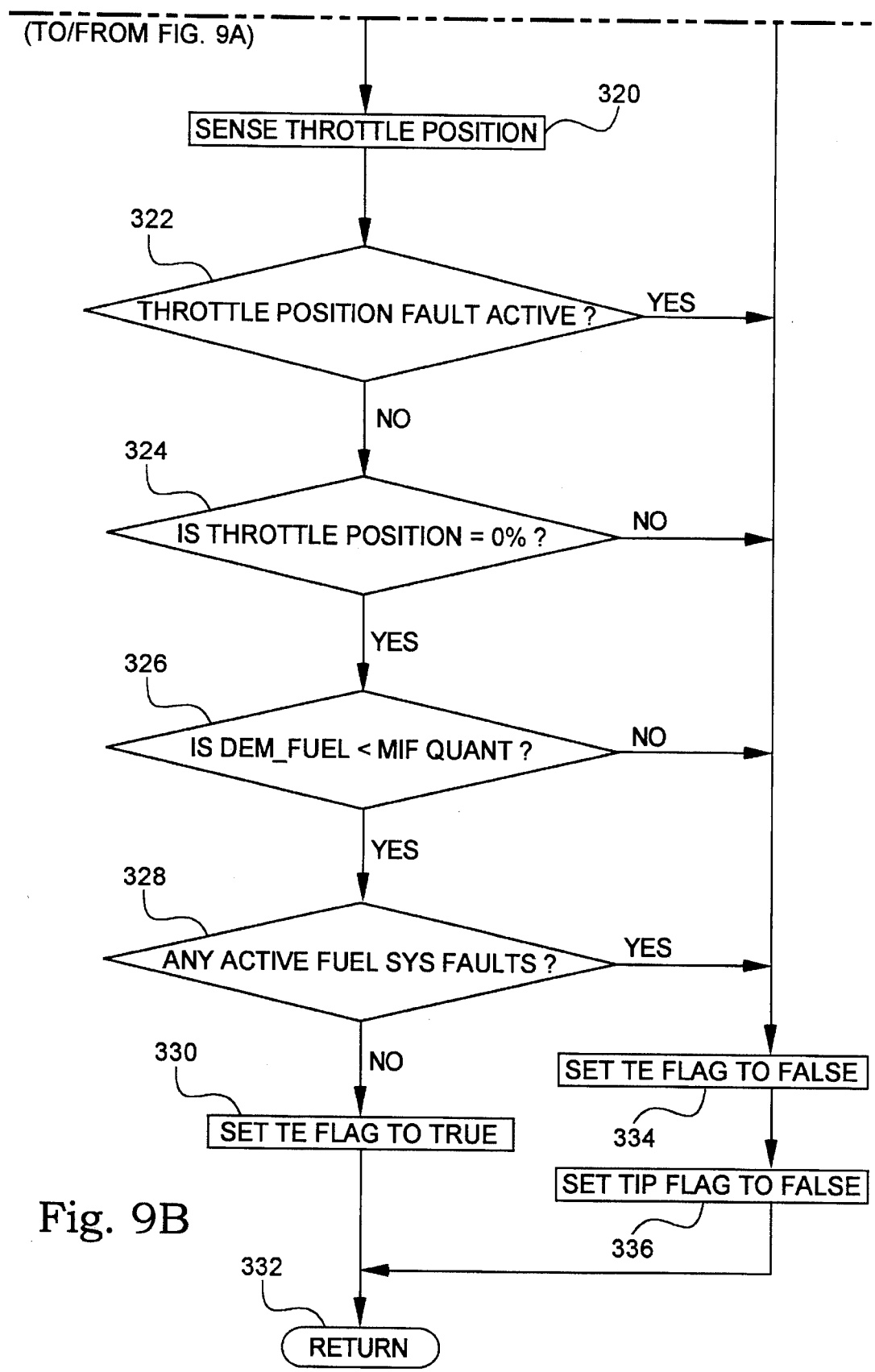

Referring now to FIG. 9, the test enable routine 300 begins at step 302 by sensing engine speed. At step 304, the status of any engine speed faults are tested. If any engine speed fault is active at step 304, the algorithm continues at step 334 where the test enable (TE) flag is set to false. If, at step 304, no engine speed fault is active, the sensed engine speed is tested at step 306. If, at step 306, the sensed engine speed is less than 720 RPM, the algorithm continues at step 308. If the engine speed is greater than or equal to 720 RPM at step 306, the algorithm continues at step 334.

At step 308, vehicle speed is sensed and the status of any vehicle speed faults are tested thereafter at step 310. If any vehicle speed faults are active at step 310, the algorithm continues at step 334. If, at step 310, no vehicle speed faults are active, the sensed vehicle speed is tested at step 312. If, at step 312, the sensed vehicle speed is equal to 0 mph, the algorithm continues at step 314. If, at step 312, the sensed vehicle speed is not equal to 0 mph, the algorithm continues at step 334.

At step 314, coolant temperature is sensed and the status of ally coolant temperature faults are tested thereafter at step 316. If any coolant temperature faults are active at step 316, the algorithm continues at step 334. If, at step 316, no coolant temperature faults are active, the sensed coolant temperature is tested at step 318. If, at step 318, the sensed coolant temperature is greater than 140° F., the algorithm continues at step 320. If, at step 318, the sensed coolant temperature is less than or equal to 140° F., the algorithm continues at step 334.

At step 320, throttle position is sensed and the status of any throttle position faults are tested thereafter at step 322. If any throttle position faults are active at step 322, the algorithm continues at step 334. If, at step 322, no throttle position faults are active, the sensed throttle position is tested at step 324. If, at step 324, the sensed throttle position is equal to 0%, the algorithm continues at step 326. If, at step 324, the sensed throttle position is not equal to 0%, the algorithm continues at step 334.

At step 326, the fueling signal dem_fuel is tested. If dem_fuel at step 326 is less than a misfire fuel quantity, corresponding to the Altered_Fuel quantity discussed above, the algorithm continues at step 334. If, at step 326, dem_fuel is greater than or equal to the misfire fuel quantity, the status of any fuel system faults are tested at step 328. If, at step 328, any fuel system faults are active, the algorithm continues at step 334. If no fuel system faults are active at step 328, the test enable (TE) flag is set to true at step 330 and the algorithm returns to the calling program at step 332. If the TE flag is set to false at step 334, on the other hand, the TIP flag is set to false at step 336 and the algorithm returns to the calling program at step 332.

Figure 10:
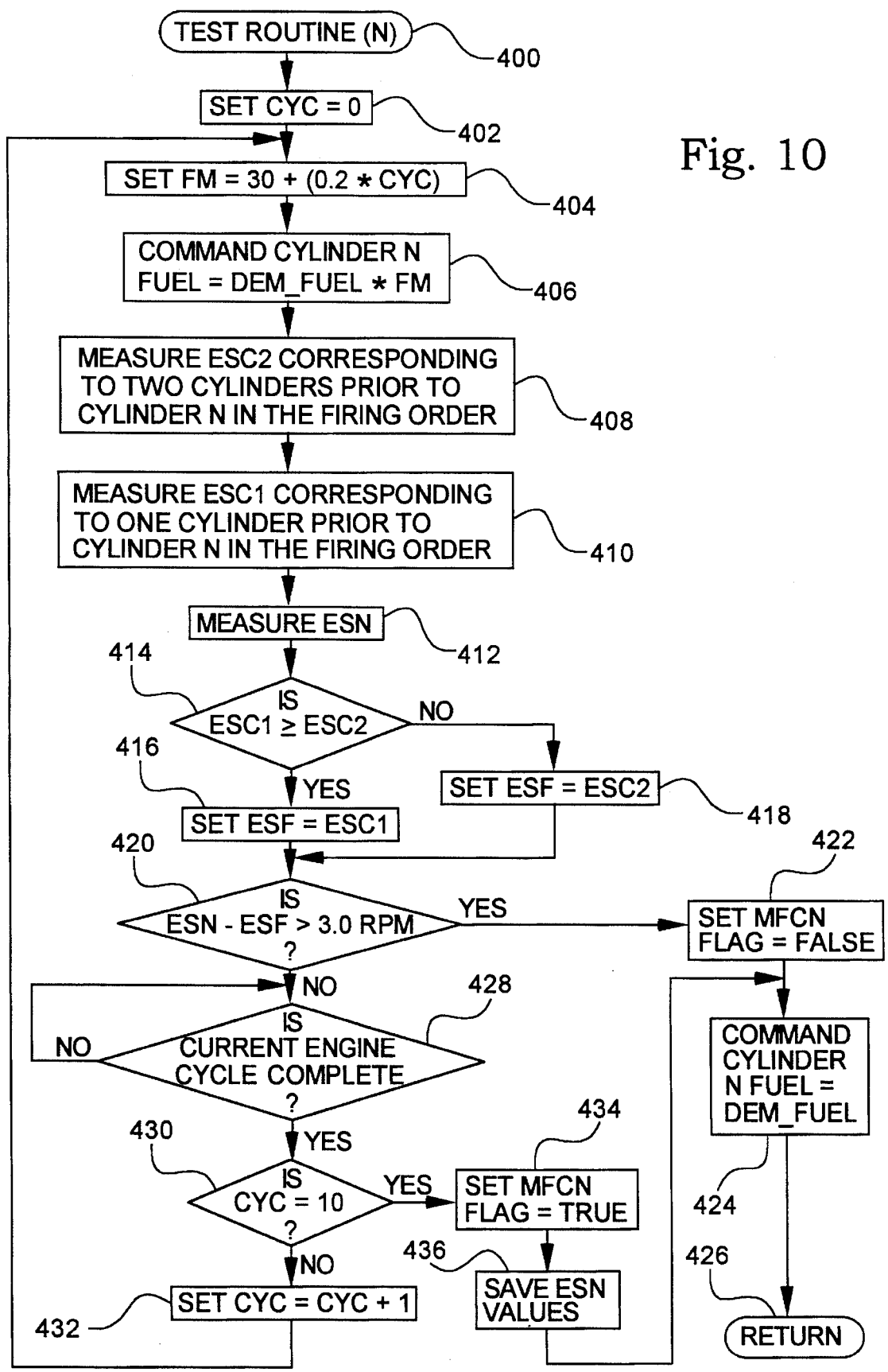
FIG. 10 is a flowchart of a cylinder misfire test routine executable by the algorithm of FIGS. 8A and 8B.

Referring now to FIG. 10, the misfire test routine 400 begins at step 402 by setting an engine cycle counter CYC equal to zero. At step 404, a fuel multiplier value is defined as FM=30+(0.2+CYC). Thereafter at step 406, cylinder N is commanded with an amount of fuel dem_fuel (equal to the fueling signal corresponding to that demanded by the cylinder), multiplied by the fuel multiplier FM. Thereafter, at step 408, an engine speed ESC2 is measured, corresponding to the engine speed of two cylinders prior to cylinder N in the firing order. Thereafter at step 410, an engine speed ESC1 is measured, corresponding to the engine speed of the cylinder prior to cylinder N in the firing order. Thereafter at step 412, an engine speed ESN is measured, corresponding to the engine speed of cylinder N.

The algorithm continues at step 414 where the engine speed ESC1 is compared with the engine speed ESC2. If ESC1 is greater than or equal to ESC2 at step 414, then a fastest engine speed variable ESF is set equal to ESC1 at step 416. If ESC2 is less than ESC1 at step 414, ESF is set equal to ESC2 at step 418. After the value ESF is set at either step 416 or step 418, the engine speed of the cylinder under test ESN is compared to the engine speed of the fastest of the previous two cylinders in the firing order ESF at step 420. If, at step 420, ESN is greater than ESF by at least 3 RPM, then the misfire cylinder flag for cylinder N (MFCN) is set to false at step 422. If, at step 420, ESN is not greater than ESF by at least 3 RPM, the status of the engine cycle is tested at step 428.

Once the current engine cycle is detected as being complete at step 428, the engine cycle counter CYC is tested at step 430. If CYC is less than 10 at step 430, CYC is incremented by 1 at step 432 and the algorithm loops back to step 404 to test the next cylinder in the sequence of cylinders to be tested. If, at step 430, CYC equals 10, the misfire flag for cylinder N (MFCN) is set to true at step 434 and the ESN values are saved within memory 15. If the MFCN flag was set to false at step 422, or the ESN values were saved at step 436, cylinder N is fueled according to the fueling signal dem_fuel at step 424. The routine 400 is thereafter returned to the calling program at step 426.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for detecting a misfire condition in a cylinder of an internal combustion engine comprising:

a fueling system responsive to a fueling signal to supply fuel to the engine cylinder;

an engine speed sensor operable to sense engine speed at a predetermined crank angle of the engine corresponding to the engine speed of the cylinder and provide an engine speed signal corresponding thereto; and a microprocessor providing a fueling signal to said fueling system to supply a quantity of fuel to the engine cylinder in excess of that demanded by the engine cylinder, said microprocessor being responsive to said engine speed signal to detect a misfire condition in the engine cylinder if the engine speed at said predetermined crank angle has not increased in accordance with the excess quantity of fuel supplied thereto within a number of subsequent engine cycles.

2. The apparatus of claim 1 wherein said fueling signal provided by said microprocessor is the product of a fueling signal required to provide the quantity of fuel demanded by the cylinder and a fuel multiplier value.

3. The apparatus of claim 2 wherein said fuel multiplier value is the sum of an initial fuel multiplier value and an increasing ramp value.

4. The apparatus of claim 3 wherein said initial fuel multiplier value is a fixed constant;

and wherein said ramp value is a linearly increasing value proportional to the number of engine cycles elapsed since initially providing said fueling signal.

5. The apparatus of claim 1 wherein the engine includes a plurality of cylinders having a cylinder firing order;

and wherein said microprocessor determines whether the engine speed at said predetermined crank angle has increased in accordance with the excess quantity of fuel supplied to the cylinder by comparing the engine speed to an identically determined engine speed for at least one previous cylinder in the cylinder firing order, and determining that the engine speed at said predetermined crank angle has increased in accordance with the excess quantity of fuel supplied to the cylinder if the engine speed of the cylinder is in excess of the largest engine speed of the at least one previous cylinder in the firing order by a delta speed value.

6. The apparatus of claim 5 wherein said microprocessor determines whether the engine speed at said predetermined crank angle has increased in accordance with the excess quantity of fuel supplied to the cylinder by comparing the engine speed to an identically determined engine speed for the two previous cylinders in the cylinder firing order.

7. The apparatus of claim 1 wherein said microprocessor is operable to test the cylinder for a misfire condition a repeat number of times if a misfire condition is detected.

8. The apparatus of claim 7 wherein said microprocessor includes memory and sets a temporary fault flag therein if a misfire condition is detected at least repeat number of times.

9. The apparatus of claim 7 further including:

an engine ignition device operable to start the engine when activated and stop the engine when deactivated; and a driver warning device;

wherein said microprocessor is operable to activate said driver warning device if a misfire condition is detected at least repeat number of times after a sequential number of ignition activation events.

10. The apparatus of claim 9 wherein the engine includes a plurality of cylinders and said microprocessor is operable to detect a misfire condition in any of the plurality of cylinders.

11. The apparatus of claim 10 wherein said microprocessor is operable to sequentially test each of the plurality of cylinders for the misfire condition after a misfire test delay number of engine cycles between each test.

12. The apparatus of claim 1 wherein the engine includes a plurality of cylinders and said microprocessor is operable to detect a misfire condition in any of the plurality of cylinders.

13. An apparatus for detecting a misfire condition in a cylinder of an internal combustion engine comprising:

a fuel control system responsive to a fuel command input signal to provide a fueling signal;

a fueling system responsive to said fueling signal to supply fuel to the engine cylinder;

an engine speed sensor operable to sense engine speed at a predetermined crank angle of the engine corresponding to the engine speed of the cylinder and provide an engine speed signal corresponding thereto; and a microprocessor providing said fuel command input signal to said fuel control system, said microprocessor being operable in a first mode to permit said fuel control system to provide said fueling signal to said fueling system to thereby fuel the cylinder in accordance with engine demand, and in a second mode to receive said fueling signal from said fuel control system and provide an altered fueling signal to said fueling system to thereby supply a quantity of fuel to the cylinder above that demanded by the engine, said microprocessor being responsive to said engine speed signal in said second mode of operation to detect a misfire condition in the engine cylinder if the engine speed at said predetermined crank angle has not increased in accordance with the excess quantity of fuel supplied thereto within a number of subsequent engine cycles.

14. The apparatus of claim 13 further including a switch actuatable by said microprocessor to a first position to direct said fueling signal to said fueling system in said first mode of operation, and to a second position to direct said fueling signal to said microprocessor in said second mode of operation.

15. The apparatus of claim 14 wherein said engine speed sensor is further operable to sense an overall engine speed and provide an overall engine speed signal corresponding thereto;

and wherein said microprocessor is responsive to said overall engine speed signal to actuate said switch to said second position if the overall engine speed is below a maximum idle speed for at least a test delay time period.

16. The apparatus of claim 15 further including:

a vehicle speed sensor operable to sense vehicle speed and provide a vehicle speed signal corresponding thereto;

wherein said microprocessor is responsive to said vehicle speed signal to actuate said switch to said second position if, as an additional condition thereto, the vehicle speed is below a maximum vehicle speed for at least said test delay time period.

17. The apparatus of claim 16 further including:

a coolant temperature sensor operable to sense the temperature of the engine coolant and provide a coolant temperature signal corresponding thereto;

wherein said microprocessor is responsive to said coolant temperature signal to actuate said switch to said second position if, as an additional condition thereto, the coolant temperature is above a minimum coolant temperature for at least said test delay time period.

18. The apparatus of claim 17 further including:

a throttle position sensor operable to sense the position of the engine throttle and provide a throttle position signal corresponding thereto;

wherein said microprocessor is responsive to said throttle position signal to actuate said switch to said second position if, as an additional condition thereto, the throttle position is below a maximum throttle position for at least said test delay time period.

19. The apparatus of claim 18 wherein said microprocessor is responsive to said fuel command input signal to actuate said switch to said second position if, as an additional condition thereto, said fuel command input signal is below a maximum fuel quantity.

20. The apparatus of claim 19 wherein said engine speed sensor, said vehicle speed sensor, said coolant temperature sensor and said throttle position sensor each include means for providing said microprocessor with a sensor fault status signal corresponding to a fault condition therein;

and wherein said microprocessor is responsive to each of said sensor fault status signals to actuate said switch to said second position if, as an additional condition thereto, any of said sensor fault status signals indicate a corresponding active sensor fault condition.

21. The apparatus of claim 20 wherein said fuel control system includes means for providing said microprocessor with a fuel system fault status signal corresponding to a fault condition therein;

and wherein said microprocessor is responsive to said fuel system fault status signal to actuate said switch to said second position if, as an additional condition thereto, said fuel system fault status signal indicates an active fuel system fault condition.

22. The apparatus of claim 21 wherein said microprocessor is operable to activate said switch from said second position to said first position if the overall engine speed exceeds said maximum idle speed, the vehicle speed exceeds said maximum vehicle speed, the coolant temperature falls below said minimum coolant temperature, the throttle position exceeds said maximum throttle position, said fueling signal exceeds said maximum fuel quantity, any of said sensor fault conditions are active, or any of said fuel system fault conditions are active, while said microprocessor is operating in said second mode of operation.

23. A method of detecting a misfire condition in a cylinder of an internal combustion engine, the engine having an engine speed sensor associated therewith for sensing engine speed, the method comprising the steps of:

(1) providing a quantity of fuel to the cylinder in excess of that demanded by the cylinder;

(2) sensing engine speed at a predetermined crank angle of the engine corresponding to the engine speed of the cylinder; and (3) detecting a misfire condition in the cylinder if the engine speed at said predetermined crank angle has not increased in accordance with the excess quantity of fuel supplied thereto within a number of subsequent engine cycles.

24. The method of claim 23 wherein said quantity of fuel provided to the cylinder is the product of the quantity of fuel demanded by the cylinder and a fuel multiplier value.

25. The method of claim 24 wherein said fuel multiplier value is the sum of an initial fuel multiplier value and an increasing ramp value.

26. The method of claim 25 wherein said initial fuel multiplier value is a fixed constant;

and wherein said ramp value is a linearly increasing value proportional to the number of engine cycles elapsed since initially providing said quantity of fuel to the cylinder.

27. The method of claim 23 wherein the engine includes a plurality of cylinders having a cylinder firing order;

and wherein the determination in step (3) of whether the engine speed at said predetermined crank angle has increased in accordance with the excess quantity of fuel supplied to the cylinder includes the steps of:

(3)(a) comparing the engine speed to an identically determined engine speed for at least one previous cylinder in the cylinder firing order; and (3)(b) determining that the engine speed at said predetermined crank angle has increased in accordance with the excess quantity of fuel supplied to the cylinder if the engine speed of the cylinder is in excess of the largest engine speed of the at least one previous cylinder in the firing order by a delta speed value.

28. The method of claim 27 wherein the determination of whether the engine speed at said predetermined crank angle has increased in accordance with the excess quantity of fuel supplied to the cylinder is made by comparing the engine speed to an identically determined engine speed for the two previous cylinders in the cylinder firing order.

29. The method of claim 23 further including the steps of:

(4) performing steps (1)–(3) a repeat number of times if a misfire condition is detected in the cylinder.

30. The method of claim 29 wherein the engine includes an engine ignition device operable to start the engine when activated and stop the engine when deactivated, and wherein the method further includes the step of:

(5) providing a warning indication if a misfire condition is detected at least repeat number of times after a sequential number of ignition activation events.

31. The method of claim 30 wherein the engine includes a plurality of cylinders and the method is performed to detect a misfire condition in any of the plurality of cylinders.

32. The method of claim 31 wherein the method is operable to sequentially test each of the plurality of cylinders for the misfire condition after a misfire test delay number of engine cycles between each test.

33. The method of claim 23 wherein the engine includes a plurality of cylinders and the method is operable to detect a misfire condition in any of the plurality of cylinders.

34. A method of detecting a misfire condition in a cylinder of an internal combustion engine, the engine having an engine speed sensor associated therewith for sensing engine speed, the method comprising the steps of:

(1) sensing an average engine speed;

(2) performing step (1) until said average engine speed is below a maximum idle speed for at least a first delay period;

(3) providing a quantity of fuel to the cylinder in excess of that demanded by the cylinder;

(4) sensing engine speed at a predetermined crank angle of the engine corresponding to the engine speed of the cylinder;

(5) sensing an average engine speed;

(6) returning to step (1) if said average engine speed is below said maximum idle speed;

(7) detecting a normal cylinder condition if the engine speed at said predetermined crank angle has increased in accordance with the excess quantity of fuel supplied thereto;

(8) performing steps (3)–(7) for a number of engine cycles unless a normal cylinder condition is detected; and (9) detecting a misfire condition in the cylinder if a normal cylinder condition has not been detected.

35. The method of claim 34 wherein the engine further has a vehicle speed sensor associated therewith for sensing vehicle speed, the method further including the following step after step (1) but before execution of step (2), and after step (5) but before execution of step (6):

(a) sensing vehicle speed;

wherein step (2) further includes performing step (a) until said vehicle speed is below a maximum vehicle speed for said first time delay;

and wherein step (6) further includes the condition or if said vehicle speed exceeds said minimum vehicle speed.

36. The method of claim 35 wherein the engine further has an engine coolant temperature sensor associated therewith for sensing engine coolant temperature, the method further including the following step after step (1) but before execution of step (2), and after step (5) but before execution of step (6):

(b) sensing coolant temperature;

wherein step (2) further includes performing step (b) until said coolant temperature exceeds a minimum coolant temperature for said first time delay;

and wherein step (6) further includes the condition or if said coolant temperature falls below said minimum coolant temperature.

37. The method of claim 36 wherein the engine has a throttle position sensor associated therewith for sensing throttle position, the method further including the following step after step (1) but before execution of step (2), and after step (5) but before execution of step (6):

(c) sensing throttle position;

wherein step (2) further includes performing step (c) until said throttle position is less than a maximum throttle position for said first time delay;

and wherein step (6) further includes the condition or if said throttle position exceeds said maximum throttle position.

38. The method of claim 37 further including the following step after step (1) but before execution of step (2), and after step (5) but before execution of step (6):

(d) determining the quantity of fuel demanded by the engine cylinder;

wherein step (2) further includes performing step (d) until the quantity of fuel demanded by the engine cylinder is less than a maximum fuel quantity for said first time delay;

and wherein step (6) further includes the condition or if the quantity of fuel demanded by the engine cylinder exceeds said maximum fuel quantity.

39. The method of claim 38 further including the following step after step (1) but before execution of step (2), and after step (5) but before execution of step (6):

(e) determining whether a fault condition exists in any of the sensors;

wherein step (2) further includes performing step (e) until no sensor faults are active for said first time delay;

and wherein step (6) further includes the condition or if any of the sensor faults are active.

40. The method of claim 39 wherein the engine further has a fuel control system for controlling fuel delivery to the cylinder, the method further including the following step after step (1) but before execution of step (2), and after step (5) but before execution of step (6):

(f) determining whether a fault condition exists in the fuel control system;

wherein step (2) further includes performing step (f) until no fuel system faults are active for said first time delay; and wherein step (6) further includes the condition or if a fuel control system fault is active.

* * * * *